United States Patent
Sugimoto et al.

(10) Patent No.: US 12,372,355 B2
(45) Date of Patent: Jul. 29, 2025

(54) LASER SCANNING CONTROL DEVICE, LASER SCANNING APPARATUS, LASER SCANNING CONTROL METHOD, AND PROGRAM

(71) Applicant: TOPCON CORPORATION, Tokyo (JP)

(72) Inventors: Hiroaki Sugimoto, Tokyo (JP); Hideki Morita, Tokyo (JP)

(73) Assignee: TOPCON CORPORATION, Tokyo (JP)

( * ) Notice: Subject to any disclaimer, the term of this patent is extended or adjusted under 35 U.S.C. 154(b) by 388 days.

(21) Appl. No.: 18/168,586

(22) Filed: Feb. 14, 2023

(65) Prior Publication Data

US 2023/0258450 A1    Aug. 17, 2023

(30) Foreign Application Priority Data

Feb. 16, 2022   (JP) .................................. 2022-022221
Jul. 14, 2022   (JP) .................................. 2022-112957

(51) Int. Cl.
G01C 15/00      (2006.01)

(52) U.S. Cl.
CPC .................................. *G01C 15/002* (2013.01)

(58) Field of Classification Search
CPC ............................ G01C 15/002; G01C 15/004
USPC .................................................... 33/228, 290
See application file for complete search history.

(56) References Cited

U.S. PATENT DOCUMENTS

| | | | | |
|---|---|---|---|---|
| 6,164,540 | A * | 12/2000 | Bridgelall | G06K 7/10851 |
| | | | | 235/455 |
| 9,476,695 | B2 * | 10/2016 | Becker | G01C 15/002 |
| 11,592,291 | B2 * | 2/2023 | Sasaki | G01C 15/06 |
| 11,598,637 | B2 * | 3/2023 | Ohtomo | G01C 15/002 |
| 11,828,931 | B2 * | 11/2023 | Yasutomi | G01S 17/86 |
| 12,188,770 | B2 * | 1/2025 | Sasaki | G01S 7/4808 |
| 2017/0285149 | A1 | 10/2017 | Lekas et al. | |

(Continued)

FOREIGN PATENT DOCUMENTS

JP    2926521 B2    7/1999

OTHER PUBLICATIONS

Extended European Search Report mailed Jul. 12, 2023 in connection with European Patent Application No. 23153477.7, 7 pgs.

*Primary Examiner* — George B Bennett
(74) *Attorney, Agent, or Firm* — Chiesa Shahinian & Giantomasi PC

(57) ABSTRACT

A technique for solving problems in laser scanning related to intense light that is reflected back from a reflector target is provided. A laser scanning control device for controlling laser scanning performed by a laser scanning apparatus includes a controller, a distance acquisition unit, and a light controller. The controller executes first laser scanning and second laser scanning. The first laser scanning is performed under conditions in which a detector of the laser scanning apparatus is saturated by light reflected back from each of reflection prisms. The second laser scanning is performed under conditions in which saturation of the detector of the laser scanning apparatus does not occur. The distance acquisition unit acquires distances to the reflection prisms based on the first laser scanning. The light controller adjusts intensity of light to be detected in the second laser scanning, based on the distances to the reflection prisms.

10 Claims, 9 Drawing Sheets

(56) References Cited

U.S. PATENT DOCUMENTS

| | | | |
|---|---|---|---|
| 2019/0025409 A1* | 1/2019 | Kawazoe | G01S 7/4817 |
| 2020/0271763 A1* | 8/2020 | Zhu | G01S 17/931 |
| 2021/0158562 A1 | 5/2021 | Nakamura et al. | |
| 2021/0285765 A1* | 9/2021 | Yuasa | G01C 15/002 |
| 2023/0083021 A1* | 3/2023 | Sasaki | G01C 15/06 |
| | | | 701/300 |
| 2023/0314610 A1* | 10/2023 | Yanobe | G01S 17/10 |
| | | | 356/4.01 |
| 2024/0019552 A1* | 1/2024 | Sugimoto | G01S 7/4816 |
| 2024/0125597 A1* | 4/2024 | Aebischer | G01C 5/00 |

\* cited by examiner

LASER SCANNING CONTROL DEVICE, LASER SCANNING APPARATUS, LASER SCANNING CONTROL METHOD, AND PROGRAM

CROSS-REFERENCE TO RELATED APPLICATIONS

This application claims priority from: (i) Japanese Patent Application No. 2022-022221, filed Feb. 16, 2022; and (ii) Japanese Patent Application No. 2022-112957, filed Jul. 14, 2022; the disclosure of all of which are incorporated herein by reference in their entirety.

FIELD

The present invention relates to techniques for laser scanning.

BACKGROUND

Laser scanning is employed as a surveying means at, for example, construction sites. In this technique, laser scanning is performed in a state in which a reflection prism is set up as a target.

Under these conditions, light that is reflected back from the reflection prism may have a high intensity, causing saturation of a light receiving element of a laser scanning apparatus. In consideration of this, light reduction filters are used when positioning a reflection prism. Details of this technique are disclosed in, for example, Japanese Patent No. 2926521.

The positioning of a reflection prism with the use of light reduction filters requires an operation to adjust light to an appropriate lower state. This is because excessive light reduction can cause detection of low-intensity distance measuring light that provides poor distance measurement accuracy, whereas insufficient light reduction can cause detection of high-intensity distance measuring light that saturates a light reception unit, resulting in poor distance measurement accuracy.

In order to detect distance measuring light at an appropriate detection level, light reduction filters may be finely adjusted or be swapped in small increments, by experimentally performing positioning on a reflection prism. However, this method increases operation steps and is not practical. Currently, a light reduction filter that is determined as being approximately appropriate is used, although accuracy of positioning a reflection prism is not very high.

SUMMARY

In view of these circumstances, an object of the present invention is to provide a technique for solving problems in laser scanning related to intense light that is reflected back from a reflector target.

The present invention provides a laser scanning control device for controlling laser scanning performed by a laser scanning apparatus having a light reception unit. The control device includes a processor or circuitry configured to execute first laser scanning and second laser scanning. The first laser scanning is performed under conditions in which the light reception unit is saturated by light reflected back from a reflector for surveying. The second laser scanning is performed under conditions in which saturation of the light reception unit does not occur. The processor or circuitry is further configured to acquire a distance to the reflector for surveying, based on the first laser scanning, and to adjust intensity of light to be received by the light reception unit, based on the distance to the reflector for surveying, in the second laser scanning.

In one aspect of the present invention, the intensity of light to be received by the light reception unit may be adjusted by an optical attenuator that is disposed in front of the light reception unit. In another aspect of the present invention, an attenuation amount of the optical attenuator may be adjusted to be relatively small in a case in which the distance to the reflector for surveying is relatively long, and the attenuation amount of the optical attenuator may be adjusted to be relatively large in a case in which the distance to the reflector for surveying is relatively short.

In yet another aspect of the present invention, the optical attenuator may be adjusted so that the intensity of light to be received by the light reception unit will be constant irrespective of the distance to the reflector for surveying. In yet another aspect of the present invention, the intensity of light to be received by the light reception unit may be adjusted by controlling intensity of measurement light to be emitted from a light emission unit of the laser scanning apparatus to a scanning target.

The present invention also provides a laser scanning apparatus that is incorporated with the laser scanning control device.

In yet another aspect of the present invention, the reflector for surveying may be a reflection prism, and the processor or circuitry may be further configured to detect light that is reflected back from the reflection prism. In this case, in the second laser scanning, the processor or circuitry may detect light as the light that is reflected back from the reflection prism, under the condition in which output from the light reception unit that receives the light is equal to or greater than a predetermined threshold. The predetermined threshold may be a value in a range of 5 to 50% of a maximum value of output of the light reception unit in the second laser scanning.

In yet another aspect of the present invention, the reflector for surveying may be a reflection prism, and the processor or circuitry may further include a reflection prism detector configured to detect light that is reflected back from the reflection prism. In this case, in the first laser scanning, the processor or circuitry may detect light that is reflected back from a position separated from the laser scanning apparatus by a predetermined distance or greater, as the light that is reflected back from the reflection prism, under the condition in which output from the light reception unit that receives the light is equal to or greater than a predetermined threshold. Results of the first laser scanning may contain a first bright-point group in which output of the light reception unit does not greatly depend on the distance, and a second bright-point group in which output of the light reception unit greatly depends on the distance. The predetermined distance may be defined as a shortest distance under a condition in which a maximum value of output of the light reception unit related to the second bright-point group is 70% or less of a maximum value of output of the light reception unit related to the first bright-point group. The predetermined threshold may be a value exceeding the maximum value of output of the light reception unit related to the second bright-point group at the predetermined distance.

The present invention also provides a laser scanning control method for controlling laser scanning performed by a laser scanning apparatus having a light reception unit. The method includes executing first laser scanning and second laser scanning. The first laser scanning is performed under conditions in which the light reception unit is saturated by light reflected back from a reflector for surveying. The second laser scanning is performed under conditions in which saturation of the light reception unit does not occur. The method also includes acquiring a distance to the reflector for surveying, based on the first laser scanning, and adjusting intensity of light to be received by the light reception unit, based on the distance to the reflector for surveying, in the second laser scanning.

The present invention also provides a non-transitory computer recording medium for storing computer executable instructions for controlling a laser scanning apparatus having a light reception unit. The computer executable instructions are made to, when executed by a computer processor, cause the computer processor to make the laser scanning apparatus execute first laser scanning and second laser scanning. The first laser scanning is performed under conditions in which the light reception unit is saturated by light reflected back from a reflector for surveying. The second laser scanning is performed under conditions in which saturation of the light reception unit does not occur. The computer executable instructions also cause the computer processor to acquire a distance to the reflector for surveying, based on the first laser scanning and to adjust intensity of light to be received by the light reception unit, based on the distance to the reflector for surveying, in the second laser scanning.

The present invention enables solving the problems in laser scanning related to intense light that is reflected back from a reflector target.

DETAILED DESCRIPTION

1. First Embodiment

Overview

Figure 1:
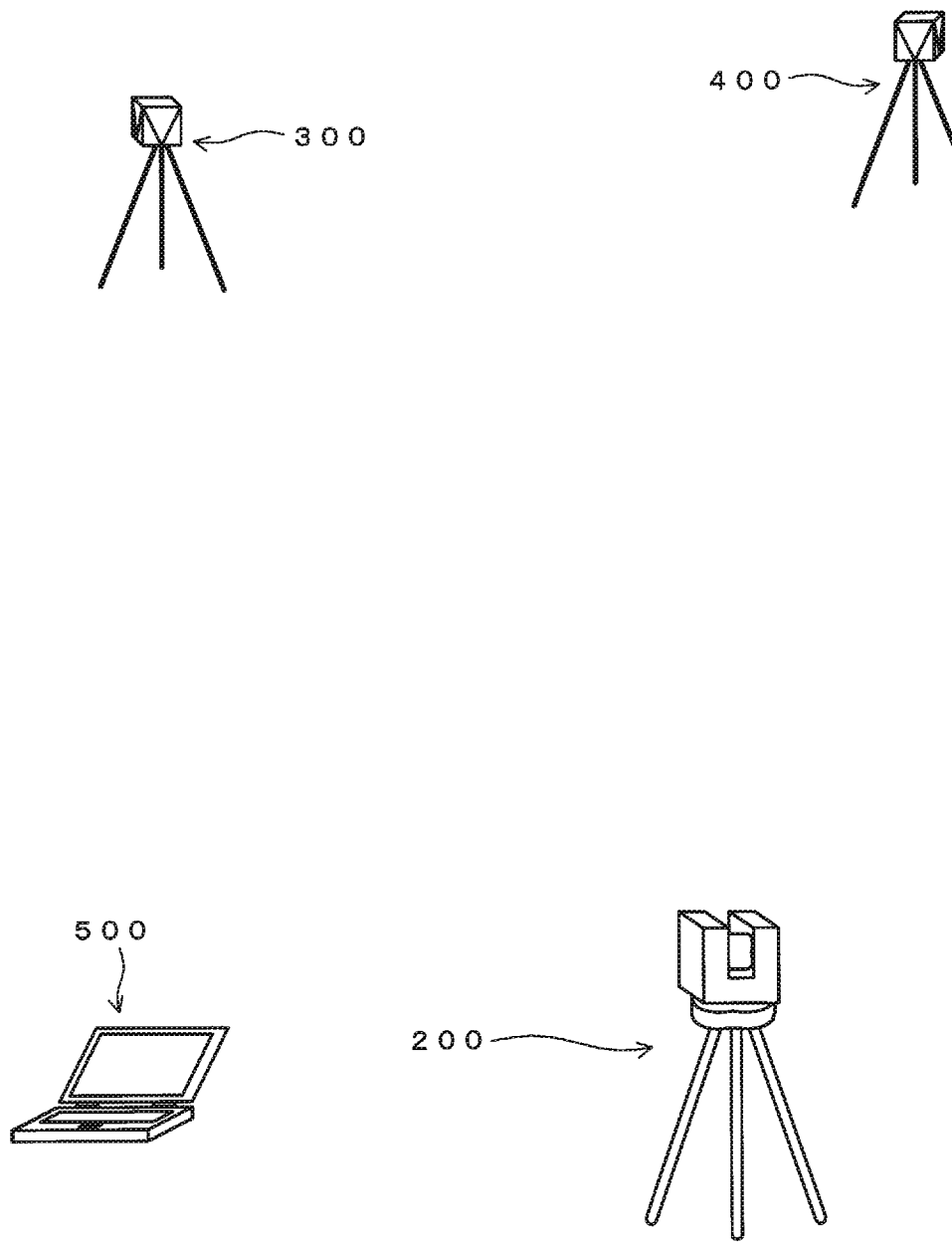
FIG. 1 shows an overview of laser scanning.

FIG. 1 shows a state in which a laser scanning apparatus 200 and reflection prisms 300 and 400 to be used as targets are set up at a site at which point cloud data is to be obtained.

In addition, FIG. 1 also shows a processing device 500 that processes data obtained by laser scanning as well as controls the laser scanning apparatus 200. The processing device 500 is a computer, and an example of using a personal computer (PC) is illustrated herein.

The reflection prisms 300 and 400 are set up at points at which positions in an absolute coordinate system are already known. The absolute coordinate system is a coordinate system that is used in a map and in a global navigation satellite system (GNSS). A local coordinate system can also be used as the coordinate system.

Although an illustration of a scanning target other than the reflection prisms is omitted in FIG. 1, a target of laser scanning (e.g., terrain or a building) is present in addition to the reflection prisms, in actual cases.

The reflection prisms 300 and 400 reflect incident light in a direction inverted by 180 degrees. Commercially available surveying reflectors are used as the reflection prisms 300 and 400. Instead of a reflection prism, another reflector such as a retroreflector can also be used.

The laser scanning apparatus 200 is set up at a position suitable for laser scanning, but the position and attitude in the absolute coordinate system thereof are not known. In this example, the laser scanning apparatus 200 performs first laser scanning in a wide range (e.g., 360-degree circumferential scanning) and performs second laser scanning mainly on the reflective prisms 300 and 400.

The first laser scanning provides point cloud data in a wide range, but in this stage, a position in the absolute coordinate system of each point is not known. This is because the position and attitude in the absolute coordinate system of the laser scanning apparatus 200 are not yet known.

For this reason, the second laser scanning is performed to position the reflection prisms 300 and 400, which are set up at points at which positions in the absolute coordinate system are already known, and the position and attitude in the absolute coordinate system of the laser scanning apparatus 200 are calculated by a method of resection.

After the position and attitude in the absolute coordinate system of the laser scanning apparatus 200 are determined, coordinates in the absolute coordinate system are provided to the point cloud data that is obtained in the first laser scanning, whereby point cloud data in the absolute coordinate system is obtained. The number of the reflection prisms may be three or more.

In the first laser scanning, light that is reflected back from each of the reflection prisms 300 and 400 is too intense and saturates a light reception unit 202 of the laser scanning apparatus 200, causing a reduction in accuracy in measuring distances of the reflection prisms 300 and 400. That is, the accuracy of positioning the reflection prisms 300 and 400 is decreased in the first laser scanning.

In view of this, the second laser scanning is performed so as to accurately position the reflection prisms 300 and 400. In this case, in order to obtain high positioning accuracy, the level of input of distance measuring light to a light receiving element is reduced by using a variable optical attenuator. The variable optical attenuator is controlled based on distance information of the reflection prisms 300 and 400, which is obtained in the first laser scanning.

Saturation of the light reception unit 202 due to input of intense light occurs mainly in the light receiving element. In the state in which the degree of saturation is low, acceptable distance measurement accuracy is ensured, although output of the light receiving element is distorted and reaches a limit. In the state in which the degree of saturation is high, distortion in waveform of output of the light receiving element is conspicuous, and error occurs in measurement of distance using a phase difference of waveforms, resulting in a reduction in distance measurement accuracy.

The second scanning is performed in consideration of the latter case, under the conditions that do not adversely affect distance measurement accuracy (under conditions that ensure desired distance measurement accuracy). Thus, saturation of the light reception unit 202 at a level that does not adversely affect distance measurement accuracy is allowed in the second scanning.

Structure of Hardware

Figure 2:
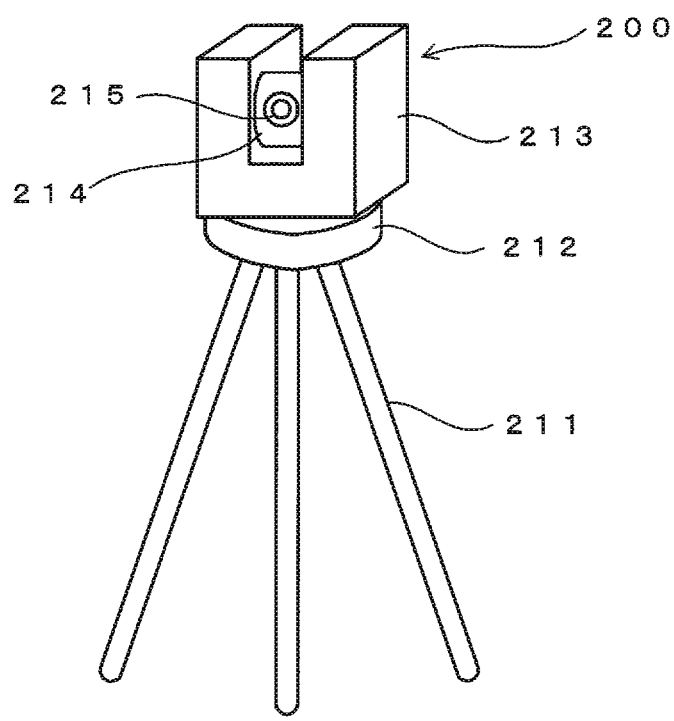
FIG. 2 shows an external appearance of a laser scanning apparatus.

FIG. 2 shows an external appearance of the laser scanning apparatus (laser scanner) 200. The laser scanning apparatus 200 includes a tripod 211, a base 212 that is fixed on the top of the tripod 211, a horizontal rotation unit 213 that is a rotary body being horizontally rotatable on the base 212, and a vertical rotation unit 214 that is a rotary body being vertically rotatable relative to the horizontal rotation unit 213. The laser scanning apparatus 200 is controlled by an external controller or control terminal which is wirelessly connected (not shown).

The vertical rotation unit 214 includes an optical unit 215 that emits and receives laser scanning light. The optical unit 215 emits pulses of laser scanning light. The emission of pulses of laser scanning light is performed along a direction (vertical plane) orthogonal to a rotation axis (axis extending in the horizontal direction) of the vertical rotation unit 214 while the vertical rotation unit 214 rotates. That is, the optical unit 215 emits pulses of laser scanning light along a vertical angle direction (direction of an elevation angle and a depression angle).

Laser scanning is performed on the surrounding area as follows: pulses of laser scanning light are emitted from the optical unit 215 while the horizontal rotation unit 213 is rotated horizontally and the vertical rotation unit 214 is rotated vertically, and the laser scanning light that is reflected back from a target object is received by the optical unit 215.

The horizontal rotation unit 213 is rotated horizontally while scanning along the vertical angle direction (upper-lower scanning) is performed, whereby the scanning line along the vertical angle direction (upper-lower scanning line) moves in such a manner as to slide along the horizontal angle (horizontal) direction. Performing the horizontal rotation at the same time as the vertical rotation causes the scanning line along the vertical angle direction (upper-lower scanning line) to not be perfectly along the vertical direction and be slightly slanted. Under the condition in which the horizontal rotation unit 213 is not rotated, scanning along the vertical angle direction (upper-lower scanning) is performed along the vertical direction.

Rotation of each of the horizontal rotation unit 213 and the vertical rotation unit 214 is performed by a motor. Each of a horizontal rotation angle of the horizontal rotation unit 213 and a vertical rotation angle of the vertical rotation unit 214 is accurately measured by an encoder.

Each laser scanning light is one pulse of distance measuring light. One pulse of the laser scanning light is emitted to a scanning target point that reflects it, and a distance of this point is thereby measured. On the basis of this measured distance value and the direction of emission of the laser scanning light, the position of the scanned point (point that reflects the laser scanning light) is calculated relative to the laser scanning apparatus 200.

In one case, the laser scanning apparatus 200 outputs a laser-scanned point cloud by providing data of a distance and a direction related to each point (each scanned point). In another case, the laser scanning apparatus 200 internally calculates a position of each point in a certain coordinate system, and a three-dimensional coordinate position of each point is output as point cloud data. Data of the laser-scanned point cloud also contains information of luminance of each scanned point (intensity of light that is reflected back from each scanned point).

Figure 3:
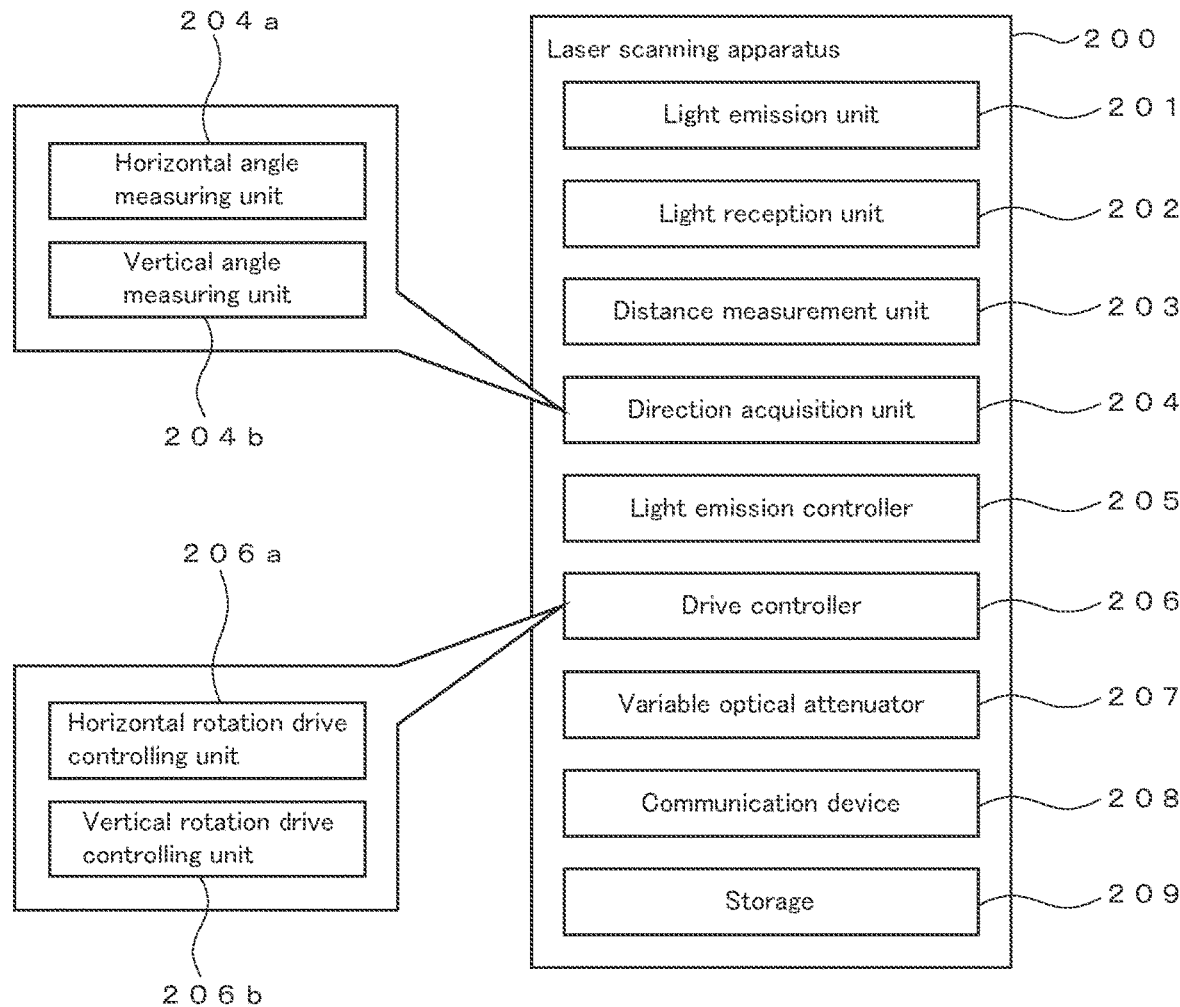
FIG. 3 shows block diagrams of the laser scanning apparatus and a processing device.
Figure 3:
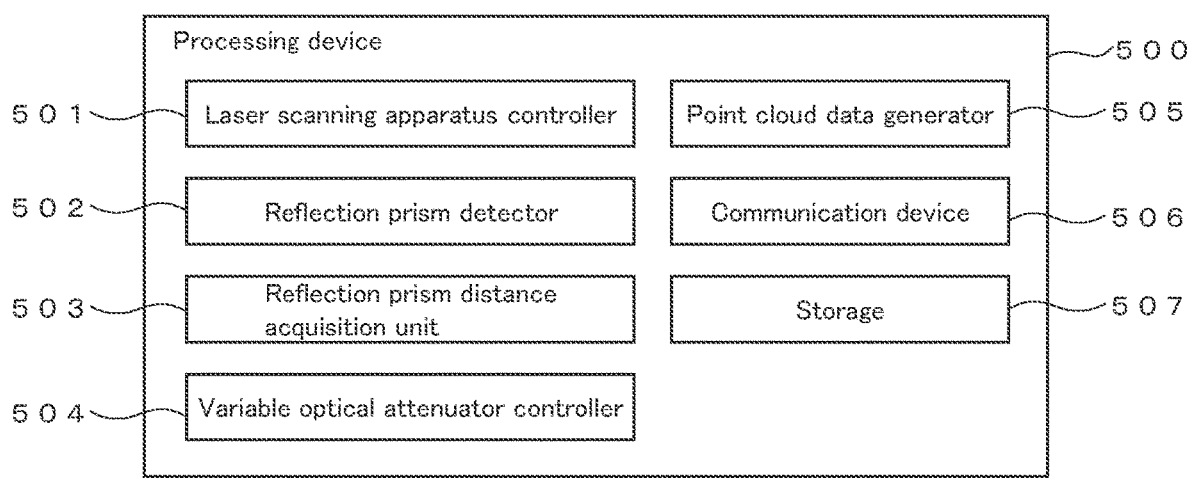

FIG. 3 shows block diagrams of the laser scanning apparatus 200 and the processing device 500. The laser scanning apparatus 200 includes a light emission unit 201, a light reception unit 202, a distance measurement unit 203, a direction acquisition unit 204, a light emission controller 205, a drive controller 206, a variable optical attenuator 207, a communication device 208, and a storage 209.

Figure 4:
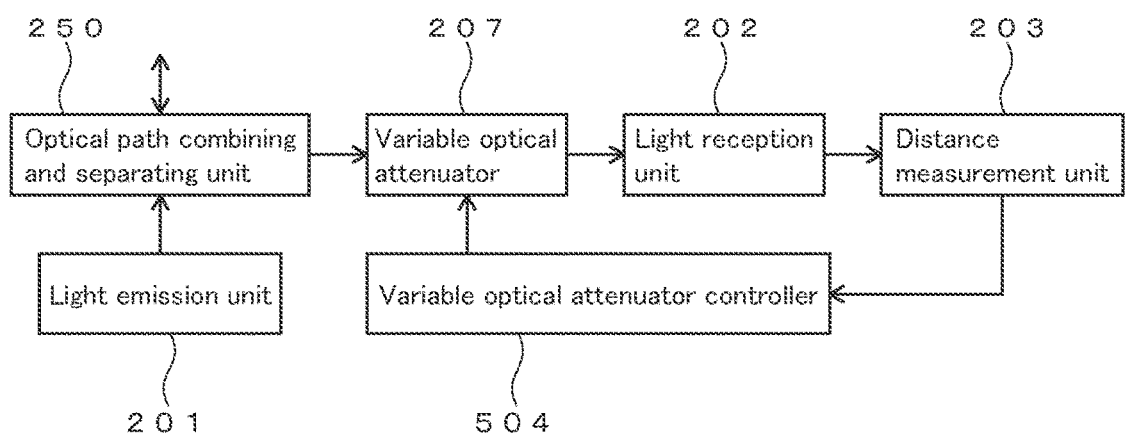
FIG. 4 is a block diagram of an optical system.

FIG. 4 is a block diagram of an optical system of the laser scanning apparatus 200. The light emission unit 201 includes a light emitting element that emits laser scanning light and also includes an optical system and peripheral circuits related to emission of light. The laser scanning light that is emitted from the light emission unit 201 is output to the outside from the optical unit 215 in FIG. 2 via an optical path combining and separating unit 250. The optical path combining and separating unit 250 is an optical system that combines and separates optical paths of emitted light and incident light by using a half mirror and a dichroic mirror.

The light reception unit 202 includes a light receiving element that receives laser scanning light and also includes an optical system and peripheral circuits related to receiving light. The laser scanning light that is reflected back is received by the optical unit 215 and is led from the optical path combining and separating unit 250 to the variable optical attenuator 207, and it is then led to the light reception unit 202. Details of the variable optical attenuator 207 will be described later.

The distance measurement unit 203 calculates a distance from the laser scanning apparatus 200 to a point that reflects laser scanning light (scanned point), based on output of the light reception unit 202. In this example, a reference optical path is provided inside the laser scanning apparatus 200. The laser scanning light is output from the light emitting element and is split into two beams. One beam is emitted from the optical unit 215 to a target object, as laser scanning light, whereas the other beam is led to the reference optical path as reference light.

The laser scanning light is reflected back from the target object and is received at the optical unit 215, whereas the reference light propagates in the reference optical path. Then, these two beams are combined and then enter the light reception unit 202. The propagation distances of the laser scanning light and the reference light differ from each other, and therefore, the reference light is detected first by the light receiving element, and the laser scanning light is then detected by the light receiving element.

In terms of an output waveform of the light receiving element, a detection waveform of the reference light is output first, and a detection waveform of the laser scanning light is then output after a time interval. The distance to the point that reflects the laser scanning light is calculated from a phase difference (time difference) between the two waveforms. In another case, the distance can also be calculated from a time-of-flight of laser scanning light.

The direction acquisition unit 204 acquires a direction of the optical axis of laser scanning light. The direction of the optical axis is obtained by measuring an angle (horizontal angle) of the optical axis in the horizontal direction and an angle (elevation angle or depression angle) of the optical axis in the vertical direction. The direction acquisition unit 204 has a horizontal angle measuring unit 204a and a vertical angle measuring unit 204b.

The horizontal angle measuring unit 204a measures a horizontal rotation angle of the horizontal rotation unit 213.

The horizontal rotation is rotation around the vertical direction. This angle is measured by an encoder. The vertical angle measuring unit 204b measures a vertical rotation angle (elevation angle or depression angle) of the vertical rotation unit 214. The vertical rotation is rotation around the horizontal direction. This angle is measured by an encoder.

Measuring a horizontal rotation angle of the horizontal rotation unit 213 and a vertical rotation angle of the vertical rotation unit 214 provides a direction of the optical axis of laser scanning light, that is, a direction of a laser-scanned point, as seen from the laser scanning apparatus 200.

The light emission controller 205 controls timing of emission of laser scanning light of the light emission unit 201. The drive controller 206 includes a horizontal rotation drive controlling unit 206a for controlling driving to make the horizontal rotation unit 213 rotate horizontally, and a vertical rotation drive controlling unit 206b for controlling driving to make the vertical rotation unit 214 rotate vertically.

The variable optical attenuator 207 attenuates light that enters the light reception unit 202 (refer to FIG. 4). The attenuation amount (attenuation factor) is variable. The attenuation amount is varied based on a distance to a target, which is calculated by the distance measurement unit 203.

The variable optical attenuator 207 may be a type that can be adjusted in transmittance by rotating a semi-transmissive disc in which the transmittance gradually varies in the circumferential direction, or may be a type in which transmittance of liquid crystals is controlled. Among commercially available modules of variable optical attenuators, an appropriate module can be selected and be used.

Light that is reflected back from a reflection prism is intense and may saturate a light receiving element, causing error in a distance measurement value. For example, experiments conducted by the inventors of the present invention show that a laser scanner with an error of several millimeters in distance measurement can generate an error on the order of centimeters with respect to light reflected back from a reflection prism. Although this error does not increase at a constant rate partly due to nonlinear operation of a light receiving element, it is approximately several to ten times the ordinary measurement error.

The variable optical attenuator 207 is disposed in front of the light reception unit 202 so as to reduce the intensity of light that enters the light reception unit 202, whereby occurrence of the above-described problems is prevented.

The communication device 208 communicates with the processing device 500, and an external controller and other devices (not shown). The communication is performed by wired communication or by using a wireless local area network (LAN), a mobile phone network, or the like. The storage 209 is composed of a semiconductor memory or a hard disk drive and stores an operation program and data that are necessary to operate the laser scanning apparatus 200 and data that is obtained during processing and as a result of operation.

The processing device 500 controls operation of the laser scanning apparatus 200 and processes point cloud data (data of laser scanned point clouds) that is obtained by the laser scanning apparatus 200. One, some, or all of functional units of the processing device 500 may be incorporated into the laser scanning apparatus 200. In addition, one, some, or all of functions of the processing device 500 may be implemented by a data processing server.

The processing device 500 is composed of a personal computer (PC). One, some, or all of the functional units may be composed of dedicated hardware.

The processing device 500 includes a laser scanning apparatus controller 501, a reflection prism detector 502, a reflection prism distance acquisition unit 503, a variable optical attenuator controller 504, a point cloud data generator 505, a communication device 506, and a storage 507.

The laser scanning apparatus controller 501 generates a control signal for controlling operation of the laser scanning apparatus 200. This control signal is transmitted from the communication device 506 to the laser scanning apparatus 200. This control signal includes a control signal for controlling laser scanning and a control signal for controlling the variable optical attenuator 207.

The reflection prism detector 502 determines whether light that is detected at the light reception unit 202 is measurement light that has been reflected back from the reflection prism (scanning light reflected back from a target), based on the intensity of the detected light. Upon determining that the light is measurement light reflected back from the reflection prism, the reflection prism detector 502 identifies and detects the light as light that has been reflected back from the reflection prism.

The reflection prism distance acquisition unit 503 acquires a measured distance (measured distance value) to the reflection prism that is detected by the reflection prism detector 502. This distance is calculated by the distance measurement unit 203.

The variable optical attenuator controller 504 generates a control signal for adjusting an attenuation amount (degree of attenuating light) of the variable optical attenuator 207. The variable optical attenuator controller 504 adjusts incident light to the light reception unit 202, to a certain level, based on the measured distance information of the reflection prism. The following describes the principle of this adjustment.

Figure 5A:
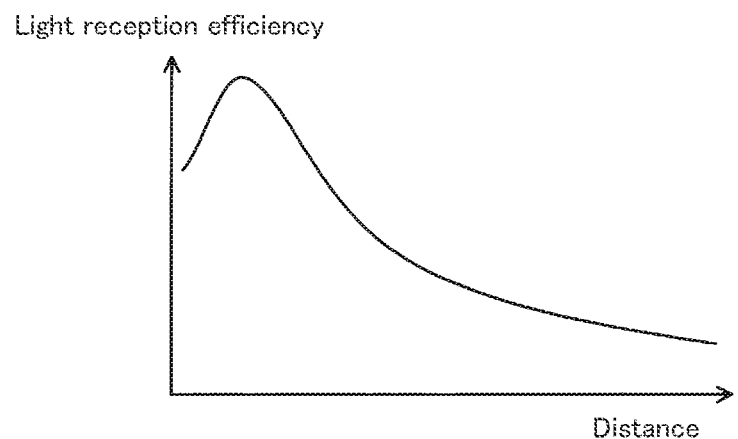
FIGS. 5A to 5C show the principle of control.
Figure 5B:
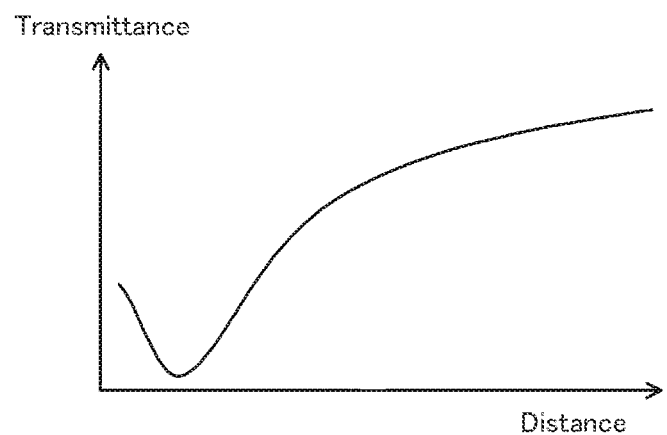
Figure 5C:
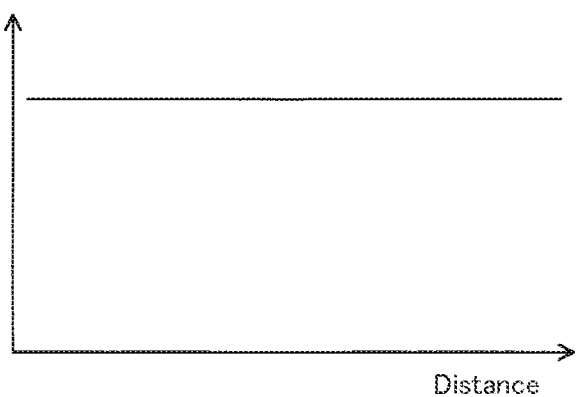

FIGS. 5A to 5C show this principle. FIG. 5A shows a distance (relative value) to a reflection point on a horizontal axis and a light reception efficiency on a vertical axis. The light reception efficiency is a ratio of incident light to output light ((intensity of incident light/intensity of output light)× 100(%)). The light reception efficiency decreases as the distance increases, and conversely, it increases as the distance decreases. The light reception efficiency is small at an extremely close distance, as shown in FIG. 5A, due to effects of non-linearity of the optical system.

In consideration of this, as shown in FIG. 5B, the attenuation amount of the variable optical attenuator 207 is reduced as the distance increases, and conversely, it is increased as the distance decreases. FIG. 5B shows a distance (relative value) to a reflection point on a horizontal axis and a transmittance of the variable optical attenuator 207 on a vertical axis. The transmittance is a value of (intensity of output light/intensity of incident light)×100(%) of the variable optical attenuator 207. As the transmittance decreases, the attenuation amount of the variable optical attenuator 207 increases.

The transmittance is adjusted depending on the distance, as shown in FIG. 5B, whereby the light receiving element of the light reception unit 202 detects a constant intensity level of light that is reflected back from the reflection prism, irrespective of the distance of the reflection prism, as shown in FIG. 5C.

Specifically, for a short distance, attenuation at the variable optical attenuator 207 increases (that is, the transmittance is reduced), whereas for a long distance, control is performed in an opposite manner. As a result, the intensity of measurement light that enters the light reception unit 202 is theoretically held constant (refer to FIG. 5C).

Herein, a value of intensity of light that is appropriate for the light reception unit 202 to receive the light (an appropriate light reception intensity) is obtained in advance, and a transmittance of the variable optical attenuator 207 necessary to achieve the appropriate light reception intensity depending on distance and a control amount necessary to implement this transmittance are examined in advance.

Specifically, assuming that a distance to the reflection prism is represented as "X," and a transmittance of the variable optical attenuator 207 is represented as "A," the relationship of "X" and "A" for making the light reception unit 202 receive light of an appropriate constant intensity value (or receive light in an appropriate intensity range) is defined as A=f(X). Normally, "A" tends to increase (a transmission amount is increased or an attenuation amount is decreased) as "X" increases (a distance to the reflection prism becomes greater), whereas it tends to decrease (attenuation amount increases) as "X" decreases (distance to the reflection prism becomes shorter).

This relationship is obtained in advance, and the variable optical attenuator controller 504 adjusts the attenuation amount (transmittance) of the variable optical attenuator 207 in accordance with a measured distance value of the reflection prism, based on this relationship. This adjustment is performed by sending a control signal (e.g., control voltage) from the variable optical attenuator controller 504 to the variable optical attenuator 207.

The point cloud data generator 505 calculates the position and attitude in the absolute coordinate system of the laser scanning apparatus 200, based on the positioning data of the reflection prisms 300 and 400 obtained in the second laser scanning, and it associates the point cloud data obtained in the first laser scanning, with the absolute coordinate system, based on the calculated position and attitude.

The communication device 506 communicates with the laser scanning apparatus 200 and other devices. The communication is performed by wired communication or by using a wireless LAN, a mobile phone network, or the like. The storage 507 is composed of a semiconductor memory or a hard disk drive and stores an operation program and data that are necessary to operate the processing device 500 and data that is obtained during processing and as a result of operations.

Example of Processing

Figure 6:
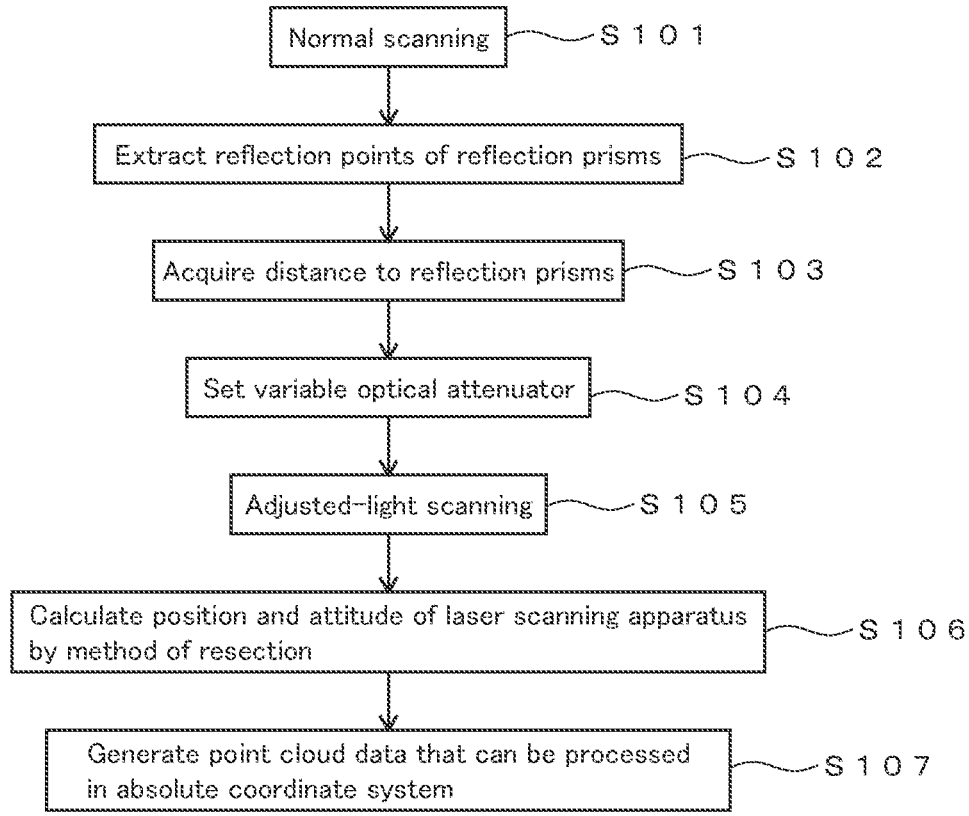
FIG. 6 is a flowchart showing an example of a processing procedure.

FIG. 6 shows an example of a processing procedure. The program for executing the processing in FIG. 6 is stored in the storage 507 of the processing device 500 and is read and executed by a central processing unit (CPU) of the computer that constitutes the processing device 500. It is also possible to store this program in an appropriate storage medium and to read this program therefrom for use.

Prior to processing in FIG. 6, first, the laser scanning apparatus 200 and the reflection prisms 300 and 400 are set up at a site where laser scanning is to be performed. At this stage, the position and attitude of the laser scanning apparatus 200 are still not known, and the reflection prisms 300 and 400 are set up at points at which positions in the absolute coordinate system are already known. The points at which positions in the absolute coordinate system are already known are positioned by preparatory surveying operation, whereby the positions are determined. A local coordinate system can also be used as the coordinate system.

Under these conditions, normal scanning (first laser scanning) is performed (step S101). The normal scanning is performed in an area from which point clouds are to be obtained. This target area can be a 360-degree circumference or a limited area. The normal scanning is performed in order to obtain point clouds of a surveying target and is performed under conditions for obtaining normal laser scanned point clouds.

The normal scanning provides data (point cloud data) of distance and direction to each point from the optical origin (origin of positioning) of the laser scanning apparatus 200. At this stage, the position and attitude in the absolute coordinate system of the laser scanning apparatus 200 are still not known, and therefore, the relationships between the point cloud data and the absolute coordinate system are not yet determined.

Next, points from which light having excessive intensity that would overload the light receiving element (extremely intense light that would saturate the light receiving element on entry) is reflected back, are extracted from among the point clouds obtained in step S101, as reflection points of the reflection prisms (step S102).

In normal scanning, in order to detect light that is reflected back from an object other than the reflection prisms, intensity of output light and detection sensitivity of incident light are set accordingly. On the other hand, the intensity of light that is reflected back from the reflection prism is excessively high and causes overload of the light receiving element under the normal scanning conditions.

In laser scanning, detection intensity of detected light (output level of the light receiving element) is also obtained as one piece of information of a point (reflection point). In step S102, points that are detected at intensities exceeding a predetermined level are extracted.

Then, distances of the points extracted in step S102 (distances from the laser scanning apparatus 200) are acquired (step S103). The distance acquired in this step is a distance calculated by the distance measurement unit 203. Due to saturation of the light receiving element, the distance measured in this step contains an error greater than normal and has an accuracy unsatisfactory for use in surveying; however, it can be used without any problem, in setting the attenuation amount of the variable optical attenuator 207, which will be described below. The process in step S103 is performed by the reflection prism distance acquisition unit 503.

Next, the attenuation amount (transmittance) of the variable optical attenuator 207 is set based on the distances to the reflection prisms, which are obtained in step S103 (step S104). This process is performed by the variable optical attenuator controller 504.

Then, adjusted-light scanning (second laser scanning) is performed (step S105). The adjusted-light scanning is laser scanning performed under the conditions set in step S104. In the adjusted-light scanning, laser scanning is performed by adjusting so that light reflected back from each of the reflection prisms 300 and 400 will not saturate the light reception unit 202. In other words, laser scanning is performed in such a manner that light is attenuated by the variable optical attenuator 207 before it enters and is detected by the light reception unit 202.

The adjusted-light scanning enables accurately positioning the reflection prisms 300 and 400. The adjusted-light scanning is performed in a limited area mainly including the reflection prisms 300 and 400. This is in order to reduce unnecessary scanning. Of course, the adjusted-light scanning may be performed on a 360-degree circumference.

The adjusted-light scanning is performed to accurately position the reflection prisms 300 and 400, whereby positional relationships between the laser scanning apparatus 200 and each of the reflection prisms 300 and 400 can be determined.

After the adjusted-light scanning is performed, the position and attitude in the absolute coordinate system of the laser scanning apparatus 200 are calculated by using a method of resection (step S106).

The following briefly describes the principle of the process performed in step S106. First, the positional relationships between the laser scanning apparatus 200 and each of the reflection prisms 300 and 400 are determined from the result of the adjusted-light scanning in step S105. This provides a shape of a triangle having apexes at the positions of the laser scanning apparatus 200 and the reflection prisms 300 and 400.

In this state, the positions in the absolute coordinate system of the reflection prisms 300 and 400 are already known. Thus, the positions in the absolute coordinate system of two apexes of the triangle can be determined. Then, the position in the absolute coordinate system of the laser scanning apparatus 200 at the other apex of the triangle can be determined.

In addition, the direction in the absolute coordinate system of each side of the triangle is also determined, whereby the attitude in the absolute coordinate system of the laser scanning apparatus 200 is also determined. In this manner, the position and attitude in the absolute coordinate system of the laser scanning apparatus 200 are calculated. This process is performed by the point cloud data generator 505. Alternatively, an exterior orientation parameter calculator may be additionally prepared, and the process in step S106 may be performed by this calculator.

After step S106, the point cloud data that is obtained in the normal scanning is associated with the absolute coordinate system. Thus, point cloud data that can be processed in the absolute coordinate system, is obtained by using the laser scanning apparatus 200 (step S107).

For example, data containing distance and direction of each point based on the origin of the laser scanning apparatus 200, coordinates in the absolute coordinate system of the origin, and the attitude in the absolute coordinate system of the laser scanning apparatus 200, in association with each other, is generated. This data is point cloud data that can be processed in the absolute coordinate system.

The point cloud data that is obtained in the normal scanning may be converted into point cloud data that is described in the absolute coordinate system. That is, after the position and attitude in the absolute coordinate system of the laser scanning apparatus 200 are determined, coordinates of the point cloud data that is obtained in the normal scanning can be converted into coordinates in the absolute coordinate system. Specifically, information related to parallel movement and rotation is required for coordinate conversion, and the information related to parallel movement is obtained from the position in the absolute coordinate system of the laser scanning apparatus 200, whereas the information related to rotation is obtained from the attitude in the absolute coordinate system of the laser scanning apparatus 200. On the basis of these pieces of information, the point cloud data that is obtained in the normal scanning is moved parallel and is rotated, whereby point cloud data described in the absolute coordinate system is obtained. This process may be performed in step S107.

Advantageous Effects

Excessive input of light into the light reception unit 202 is prevented, resulting in solving the problem in laser scanning related to intense light that is reflected back from a reflector target. Moreover, the attenuation amount of the variable optical attenuator 207 is set in accordance with the distance to the reflection prism in order to receive light that enables highly accurate distance measurement, and thus, the distance of the reflection prism is measured with high accuracy. As a result, point cloud data that is finally obtained is highly accurate.

2. Second Embodiment

Figure 7:
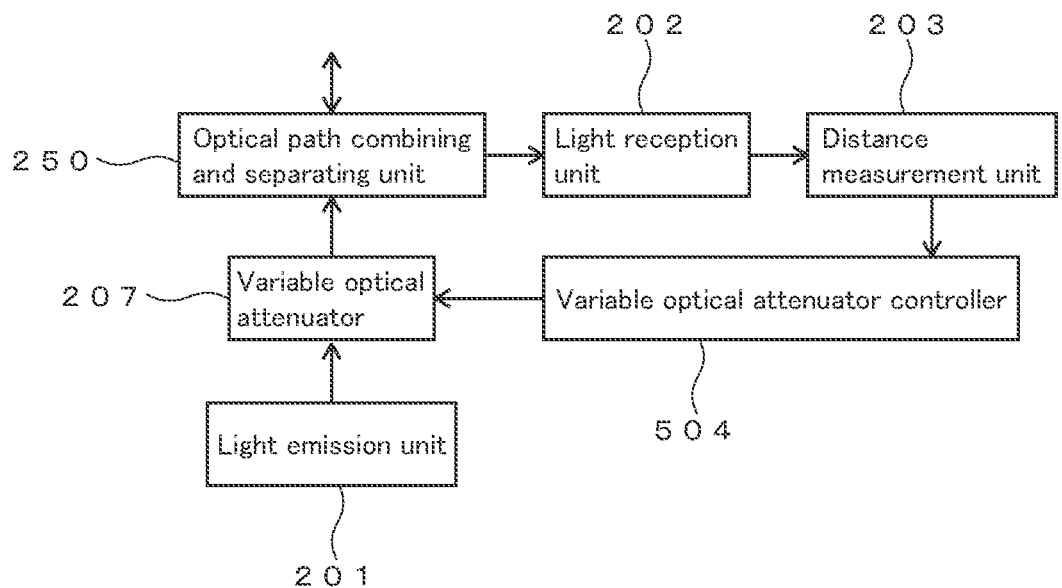
FIG. 7 is a block diagram of an optical system of another embodiment.

FIG. 7 shows an example of disposing the variable optical attenuator 207 in front of the light emission unit 201. In this case, measurement light that is emitted from the light emission unit 201 is attenuated by the variable optical attenuator 207 and is adjusted so that reflection intensity appropriate for positioning the reflection prism will be obtained.

3. Third Embodiment

Figure 8:
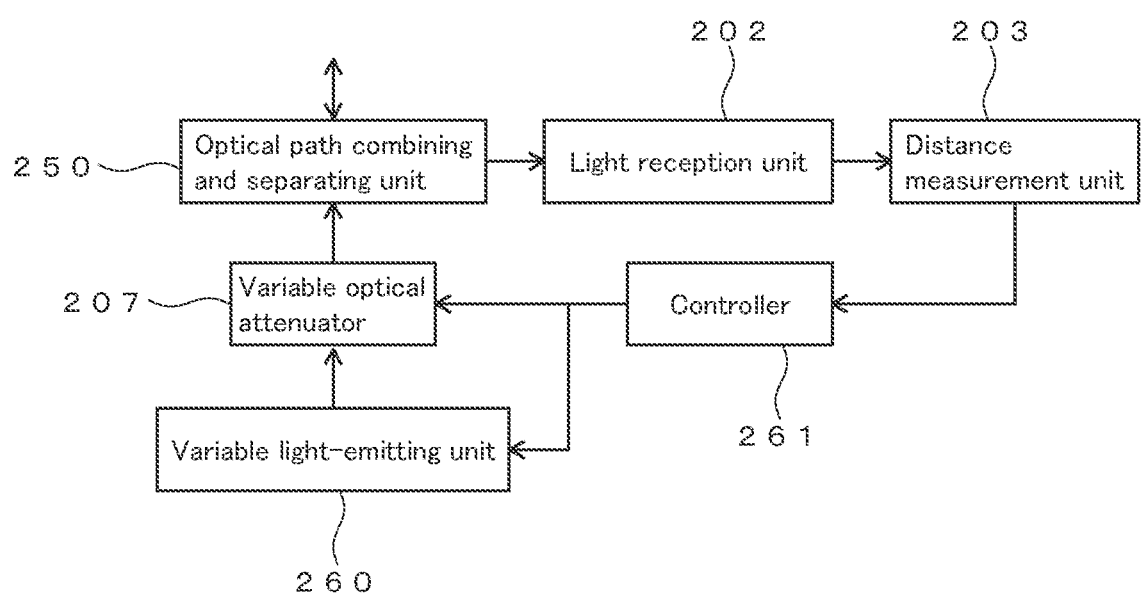
FIG. 8 is a block diagram of an optical system of yet another embodiment.

FIG. 8 shows a case of using a variable light-emitting unit 260 that emits light of variable intensity. In this case, the intensity of light to be emitted by the variable light-emitting unit 260 is adjusted by a controller 261, so that a reflection intensity appropriate for positioning the reflection prism will be obtained.

4. Fourth Embodiment

It is also possible to use a device that is configured to adjust sensitivity of the light receiving element. For example, the light receiving element may be an avalanche photodiode in which a multiplication factor can be controlled by an applied reverse voltage. With the use of this function, the multiplication factor is reduced in order to detect high intensity light that is reflected back (light from a short distance), and conversely, the multiplication factor is increased in order to detect low intensity light that is reflected back (light from a long distance). In a case in which a dynamic range cannot be ensured only by adjusting the multiplication factor, the variable optical attenuator, which is described in other embodiments, may be used together, or the intensity of light to be emitted may be adjusted at the same time.

5. Fifth Embodiment

There may be cases in which a high-reflectance reflector that reflects visible light (hereinafter referred to as a "reflector") is present, in addition to the reflection prism, at a surveying site. Examples of the reflector include reflective tapes for ensuring safety, various kinds of signs, and taillights of vehicles and construction machines. The wavelength of measurement light of the laser scanner is approximately 500 to 1500 nm, and the measurement light of the laser scanner can be reflected at high efficiency by such a reflector.

From this point of view, in steps S102 and S105 in FIG. 6, it is necessary to avoid erroneously detecting light that is reflected back from a reflector other than the reflection prism, as being light reflected back from the reflection prism.

In this embodiment, in the state in which a reflector, such as a sign or a reflective plate, is present in addition to the reflection prism, the reflection prism is detected, whereas the erroneous detection is prevented in two steps. Herein, detection of the first step is performed on the result of the normal scanning. Detection of the second step is performed on the result of the adjusted-light scanning.

As will be described later, the reflection prism and a reflector cannot be distinguished from each other at a short distance, which can cause erroneously detecting a reflector, in the first step, but the reflection prism can be distinguished from a reflector, which is not a reflection prism, and it can be reliably detected in the second step. In this case, the reflector that is not a reflection prism is a reflector other than the reflection prism and may be a light reflective object having a high reflectance, such as a reflective tape. The processes related to detection in the first step and detection in the second step are performed by the reflection prism detector 502.

Figure 9:
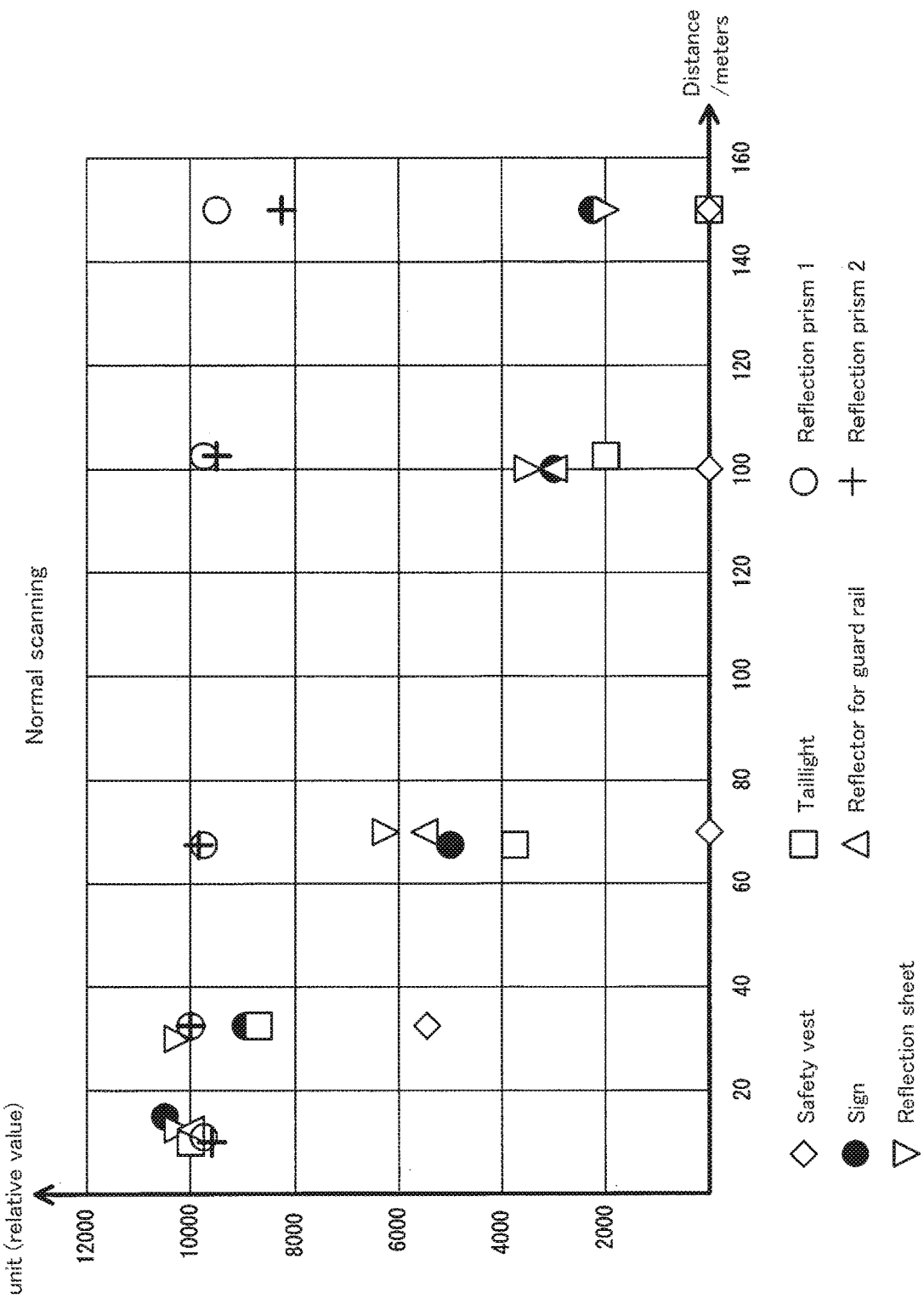
FIG. 9 is data showing relationships between a distance and output of a light reception unit in laser scanning.

The following describes details of the processes. First, detection in the first step will be described. FIG. 9 is a graph showing actually measured values of detection intensity of light reflected back from each type of reflector (vertical axis) and of a distance (in meters) from a laser scanner to the reflective object, in normal scanning. Herein, the detection intensity shown on the vertical axis is a relative value output from the light reception unit 202.

Among the reflective objects shown in FIG. 9, a safety vest is a vest having a sheet reflection material, a sign, a taillight, and a reflector for a guard rail have a reflector made of a light reflective material for the purpose of increasing visibility, and reflection prisms 1 and 2 are commercially available reflection prisms for surveying having different model numbers.

FIG. 9 shows that, in the state in which the distances from the laser scanner are long by a certain degree (in the case in FIG. 9, 60 meters or longer), output from the light reception unit 202 that received light reflected back from each of the reflection prisms differs from output from the light reception unit 202 that received light reflected back from each of the reflectors.

This phenomenon is used in step S102, and light reflected back from the reflector that is not a reflection prism is removed or is not selected. In this example, a threshold is set to an output value "8000" on the vertical axis in FIG. 9, and light having an output value equal to or greater than this threshold is selected as light that is reflected back from the reflection prism.

The threshold is set to a value that exceeds a maximum value of output of the light reception unit 202 that receives light reflected back from the reflector other than the reflection prism, at a certain distance from the laser scanner. The certain distance from the laser scanner is determined as described below.

As shown in FIG. 9, the result of the normal scanning contains a first bright-point group in which output of the light reception unit 202 does not greatly vary depending on distance, and a second bright-point group in which output of the light reception unit 202 greatly decreases with an increase in distance. In short, the scanned point clouds obtained by the normal scanning contain a first bright-point group in which output of the light reception unit 202 does not greatly depend on distance, and a second bright-point group in which output of the light reception unit 202 greatly depends on distance.

The output of the light reception unit 202 of the first bright-point group gradually decrease as the distance is further increased. This is because detected intensity of light that is reflected back gradually decreases as the distance increases due to scanning light scattering in the air and expansion of a beam of scanning light. Even in this situation, the first bright-point group in which intensity of light that is reflected back from the reflection prism does not greatly depend on distance, is clearly separated from the second bright-point group in which intensity of light reflected back from the reflector that is not a reflection prism greatly depends on distance.

Herein, the certain distance is defined as a shortest distance in the condition in which the maximum value of output of the light reception unit 202 related to the second bright-point group is 70% or less of the maximum value of output of the light reception unit 202 related to the first bright-point group.

An example of a specific procedure for calculating the certain distance will be described hereinafter. First, the result of the normal scanning is analyzed in order to find a group of bright points (first bright-point group) in which output of the light reception unit 202 is not greatly decreased, although the distance is increased, and a group of bright points (second bright-point group) in which output of the light reception unit 202 is decreased with an increase in distance. Then, a distance Lth by which these two groups are separated from each other is approximately calculated.

In the case in FIG. 9, Lth may be estimated to be approximately 40 to 60 meters; however, the minimum value is used herein, and Lth is set as 40 meters. The first bright-point group is a group of bright points of the reflection prisms, whereas the second bright-point group is a group of bright points that are obtained from the reflectors other than the reflection prisms.

Next, a maximum value Pmax1 of the first bright-point group having relatively high brightness and a maximum value Pmax2 of the second bright-point group having relatively low brightness are obtained in the range of 40 meters or greater. Then, a ratio "Pmax2/Pmax1" is calculated in the range of 40 meters or greater, and a minimum value of distance at which Pmax2/Pmax1<0.7 is then calculated. In the case in FIG. 9, this distance is approximately 60 meters.

In the case in FIG. 9, the maximum value of output of the light reception unit 202 that receives light reflected back from the reflector other than the reflection prism, at a distance separated from the laser scanner by 60 meters, is estimated to be approximately 6500 to 6750. Then, in consideration of a margin, the threshold is set at 8000.

In the case in FIG. 9, under the condition in which the distance is 60 meters or greater, light that is reflected back from the reflection prism is reliably detected by the threshold that is set, whereas light that is reflected back from the reflector other than the reflection prism is not detected. This reduces a frequency of detecting numerous unnecessary reflection points to be subjected to the adjusted-light scanning, whereby efficiency of the processing is improved.

On the other hand, in the case in FIG. 9, light that is reflected back from each of the sign, the reflection sheet, the taillight, and the reflector for a guard rail and light that is reflected back from each of the reflection prisms cannot be distinguished from each other in the state in which the distance is short and is 40 meters or less. Thus, light that is reflected back from the reflector other than the reflection prism can be erroneously detected as light that is reflected back from the reflection prism, from among the point cloud data obtained in the normal scanning.

In view of this, in this embodiment, detection of the reflection prism is also performed in the following second step. Herein, filtering using a threshold is performed also in the adjusted-light scanning in step S105.

Figure 10:
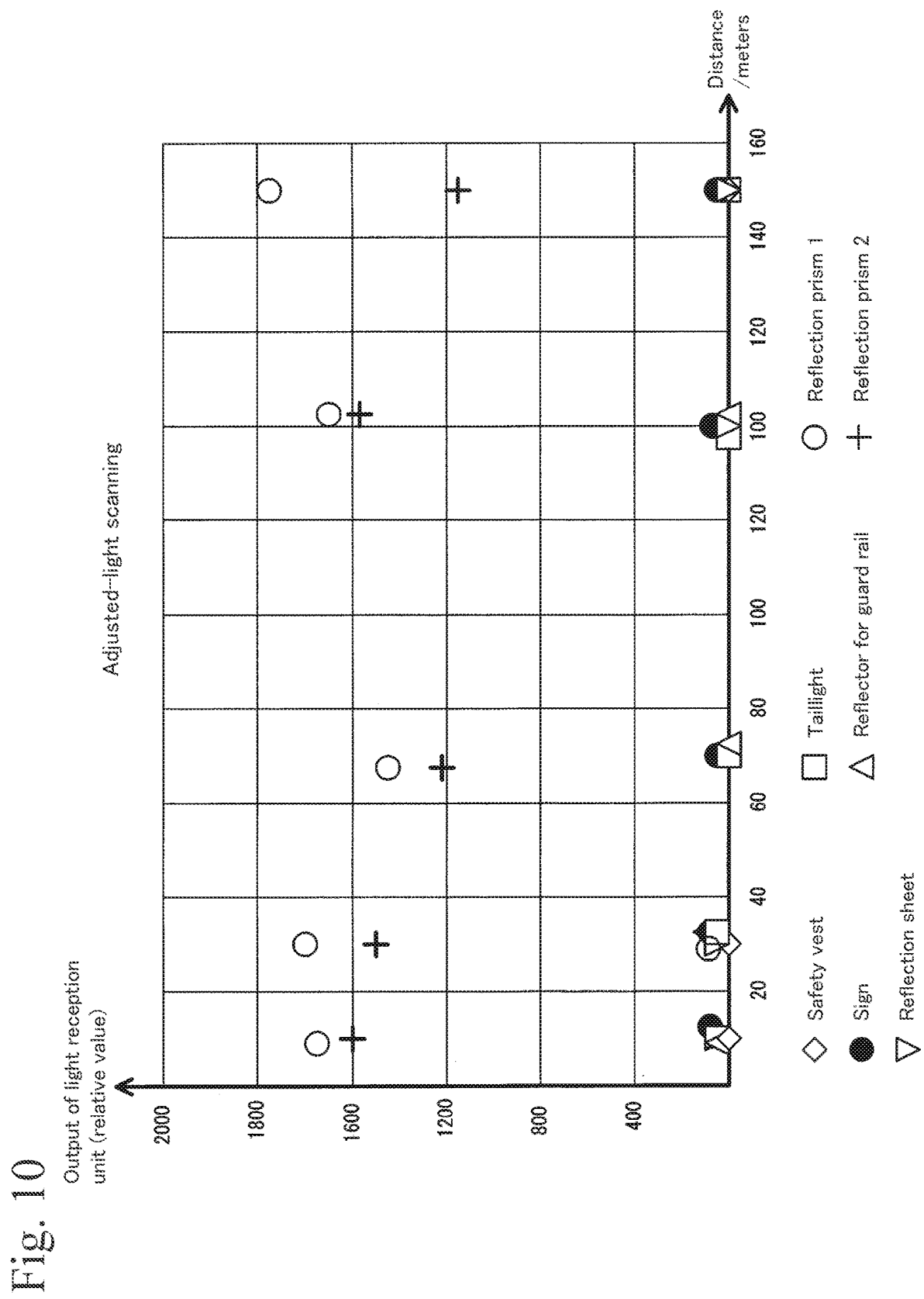
FIG. 10 is data showing relationships between a distance and output of a light reception unit in laser scanning.

FIG. 10 shows results obtained under conditions for the adjusted-light scanning, which correspond to the data in FIG. 9. In the adjusted-light scanning in this case, the intensity of scanning light entering the light receiving element is greatly reduced, compared with the normal scanning in FIG. 9. It is noted that the degrees of reduction are not uniform because the attenuation amount of the attenuator was varied in accordance with the distance.

FIG. 10 shows that output from the light reception unit 202 greatly differs (by several times) between light reflected back from each of the reflection prisms and light reflected back from each of the reflectors other than the reflection prisms, in the adjusted-light scanning. The reason of this is as follows.

In the case in FIG. 10, the level of detecting light that was reflected back from each of the reflectors was not more than 50 in terms of the relative value on the vertical axis. On the other hand, the level of detecting light that was reflected back from each of the reflection prisms was not less than 1000. In short, the output level of the light reception unit 202 for light that is reflected back from each of the reflectors is ¹⁄₂₀ or less of that for light that is reflected back from each of the reflection prisms.

This phenomenon occurs due to the following. Basically, in detecting light that is reflected back from the reflection prism in the normal scanning, the light receiving element is saturated, and linearity between input (incident light) and output (corresponding to the vertical axis in FIGS. 9 and 10) of the light receiving element is notably reduced.

This causes a decrease in accuracy of distance measurement and also causes output from the light receiving element to not correctly agree with the intensity of detected light. In more detail, the output is not increased in spite of an increase in input and is lower than a theoretical value.

As a result, the detection value of light reflected back from each of the reflection prisms in FIG. 9 is less than a theoretical value. In other words, the output of the light receiving element is saturated around the relative value 10000 on the vertical axis, and therefore, a greater value is not output when input is further increased.

The detected value of light that was reflected back from each of the reflection prisms and the detected value of light that was reflected back from each of the reflectors were close to each other in the range in which the distance was 40 meters or less in FIG. 9. However, in consideration that light that is received after being reflected back is more intense as the distance is shorter, the degree of saturation of the light receiving element for a short distance has a relationship "(light reflected back from a reflection prism)>>(light reflected back from a reflector)."

Thus, in the adjusted-light scanning in FIG. 10, the level of detecting light that was reflected back from each of the reflection prisms (output level of the light receiving element) is not linearly reduced. From another point of view, the output is not greatly decreased proportionally to a decrease in input in a state in which the degree of saturation of the light receiving element is high. That is, in relation to light that is reflected back from the reflection prism, the output of the light receiving element is not greatly reduced, although the scanning is changed from the normal scanning to the adjusted-light scanning. This can be understood as a phenomenon in which the output is not greatly reduced despite a decrease in input because the level of detecting light that is reflected back from the reflection prism is saturated and is still at the maximum, although the scanning is changed from the normal scanning to the adjusted-light scanning.

On the other hand, the degree of saturation of the light receiving element that receives light that is reflected back from the reflector is low, or the light receiving element is not saturated, and therefore, the level of the output is decreased in accordance with a decrease in input (intensity of incident light). Thus, in relation to light that is reflected back from the reflector that is not a reflection prism, the output of the light receiving element is reduced in accordance with input when the scanning is changed from normal scanning to adjusted-light scanning.

From these points of view, when the scanning is changed from normal scanning (FIG. 9) to adjusted-light scanning (FIG. 10), the level of detected light that is reflected back from each of the reflectors is notably reduced compared with reduction in the level of detected light that is reflected back from each of the reflection prisms. As a result, the level of detecting light that is reflected back from each of the reflectors is ¹⁄₂₀ or less of that for light that is reflected back from each of the reflection prisms, in the adjusted-light scanning.

The above-described mechanism can explain the reason for separation into two bright-point groups in the range of distance of 60 meters or greater in FIG. 9. The output of the light reception unit 202 in relation to each of bright points of the reflection prisms is not reduced also in the range of distance of 60 meters or greater in FIG. 9. That is, the light receiving element is still saturated and does not output a decreased value also in the range of distance of 60 meters or greater, and this phenomenon continues in the distance range in FIG. 9. Thus, in the state in which the distance is further increased, effects of saturation of the light receiving element are reduced, and the output of the light reception unit 202 can be decreased.

Herein, light that is reflected back from the reflection prism and light that is reflected back from the reflector that is not a reflection prism are identified or are distinguished from each other, among scanning data obtained in the adjusted-light scanning, by the following method. First, the maximum value of output of the light reception unit 202 in relation to the points obtained in the adjusted-light scanning is acquired. In the case in FIG. 10, the maximum value is approximately 1750, which is indicated by the scale on the vertical axis. In a case in which the maximum value is known in advance or can be estimated, the value may be used. Alternatively, an average of values of the top N points (N=50 to 1000), which are output from the light reception unit 202, may be used instead of the maximum value.

Then, a value of 20% of the maximum value, in this case, 1750×0.2=350, is set as a threshold for the determination. Under these conditions, a reflection point in which the output from the light reception unit 202 is less than the threshold, which is 350, is identified as a reflection point of the reflector that is not a reflection prism, whereas a reflection point in which the output from the light reception unit 202 is equal to or greater than the threshold, which is 350, is identified as a reflection point of the reflection prism.

As shown in FIG. 10, the output level of the light reception unit 202 differs by 20 times or more between light reflected back from each of the reflection prisms and light reflected back from each of the reflectors that are not reflection prisms, in the adjusted-light scanning. In view of this, setting the threshold as described above enables reliably detecting light that is reflected back from the reflection prism.

Although the value of 20% of the maximum value of output of the light reception unit 202 is set as the threshold in the above-described example, the threshold can be set in a range of 5 to 50%. In the case in which the threshold is less than 5% of the maximum value of output of the light receiving element, the probability of incorrectly identifying the reflector that is not a reflection prism, as the reflection prism is increased. On the other hand, in the case in which the threshold exceeds 50% of the maximum value of output of the light receiving element, the probability of failing to detect light that is reflected back from the reflection prism is increased.

In addition, it is also possible to set the threshold in accordance with the range of distance. For example, this method is effective in a case in which the maximum value greatly varies depending on the distance. In one example, a first threshold may be set for the distance of less than 50 meters, a second threshold may be set for the distance of 50 to 100 meters, and a third threshold may be set for the distance exceeding 100 meters. The threshold for each distance range is set by the method described above.

This embodiment reduces unnecessary detection, in detecting candidates to be subjected to the adjusted-light scanning based on result of the normal scanning. Moreover, this embodiment reduces the probability of wrongly detecting an object (e.g., a reflective tape) other than the reflection prism, as the reflection prism, in the adjusted-light scanning.

6. Other Matters

The embodiments described in this specification can be used in combination.

What is claimed is:

1. A laser scanning control device for controlling laser scanning performed by a laser scanning apparatus having a light reception unit, the control device comprising a processor or circuitry configured to:
   execute first laser scanning and second laser scanning, the first laser scanning being performed under conditions in which the light reception unit is saturated by light reflected back from a reflector for surveying, the second laser scanning being performed under conditions in which saturation of the light reception unit does not occur;
   acquire a distance to the reflector for surveying, based on the first laser scanning; and
   adjust intensity of light to be received by the light reception unit, based on the distance to the reflector for surveying, in the second laser scanning.

2. The laser scanning control device according to claim 1, wherein the intensity of light to be received by the light reception unit is adjusted by an optical attenuator that is disposed in front of the light reception unit.

3. The laser scanning control device according to claim 2, wherein an attenuation amount of the optical attenuator is adjusted to be relatively small in a case in which the distance to the reflector for surveying is relatively long, and the attenuation amount of the optical attenuator is adjusted to be relatively large in a case in which the distance to the reflector for surveying is relatively short.

4. The laser scanning control device according to claim 2, wherein the optical attenuator is adjusted so that the intensity of light to be received by the light reception unit is constant irrespective of the distance to the reflector for surveying.

5. The laser scanning control device according to claim 1, wherein the intensity of light to be received by the light reception unit is adjusted by controlling intensity of measurement light to be emitted from a light emission unit of the laser scanning apparatus to a scanning target.

6. A laser scanning apparatus incorporated with the laser scanning control device according to claim 1.

7. The laser scanning control device according to claim 1, wherein the reflector for surveying is a reflection prism,
the processor or circuitry is further configured to detect light that is reflected back from the reflection prism,
wherein, in the second laser scanning, the processor or circuitry detects light as the light that is reflected back from the reflection prism, on the condition that output from the light reception unit that receives the light is equal to or greater than a predetermined threshold, and
the predetermined threshold is a value in a range of 5 to 50% of a maximum value of output of the light reception unit in the second laser scanning.

8. The laser scanning control device according to claim 1, wherein the reflector for surveying is a reflection prism,
the processor or circuitry is further configured to detect light that is reflected back from the reflection prism,
wherein, in the first laser scanning, the processor or circuitry detects light that is reflected back from a position separated from the laser scanning apparatus by a predetermined distance or greater, as the light that is reflected back from the reflection prism, on the condition that output from the light reception unit that receives the light is equal to or greater than a predetermined threshold,
result of the first laser scanning contains a first bright-point group in which output of the light reception unit does not greatly depend on the distance, and a second bright-point group in which output of the light reception unit greatly depends on the distance,
the predetermined distance is defined as a shortest distance in a condition in which a maximum value of output of the light reception unit related to the second bright-point group is 70% or less of a maximum value of output of the light reception unit related to the first bright-point group, and
the predetermined threshold is a value exceeding the maximum value of output of the light reception unit related to the second bright-point group at the predetermined distance.

9. A laser scanning control method for controlling laser scanning performed by a laser scanning apparatus having a light reception unit, the method comprising:
   executing first laser scanning and second laser scanning, the first laser scanning being performed under conditions that the light reception unit is saturated by light reflected back from a reflector for surveying, the second laser scanning being performed under conditions that saturation of the light reception unit does not occur;
   acquiring a distance to the reflector for surveying, based on the first laser scanning; and
   adjusting intensity of light to be received by the light reception unit, based on the distance to the reflector for surveying, in the second laser scanning.

10. A non-transitory computer recording medium for storing computer executable instructions for controlling a laser scanning apparatus having a light reception unit, the computer executable instructions made to, when executed by a computer processor, cause the computer processor to:
   make the laser scanning apparatus execute first laser scanning and second laser scanning, the first laser scanning being performed under conditions in which the light reception unit is saturated by light reflected back from a reflector for surveying, the second laser scanning being performed under conditions in which saturation of the light reception unit does not occur;
   acquire a distance to the reflector for surveying, based on the first laser scanning; and adjust intensity of light to be received by the light reception unit, based on the distance to the reflector for surveying, in the second laser scanning.

\* \* \* \* \*